(12) United States Patent
Riepling

(10) Patent No.: US 12,596,411 B2
(45) Date of Patent: Apr. 7, 2026

(54) COOLING SUBSYSTEMS FOR PERIPHERAL DEVICES

(71) Applicant: Roku, Inc., San Jose, CA (US)

(72) Inventor: Eric Casten Riepling, San Jose, CA (US)

(73) Assignee: Roku, Inc., San Jose, CA (US)

( * ) Notice: Subject to any disclaimer, the term of this patent is extended or adjusted under 35 U.S.C. 154(b) by 491 days.

(21) Appl. No.: 17/534,063

(22) Filed: Nov. 23, 2021

(65) Prior Publication Data

US 2023/0161393 A1 May 25, 2023

(51) Int. Cl.
*G06F 1/20* (2006.01)
*G01K 1/024* (2021.01)
*G06F 3/14* (2006.01)

(52) U.S. Cl.
CPC .................. *G06F 1/20* (2013.01); *G06F 3/14* (2013.01); *G01K 1/024* (2013.01)

(58) Field of Classification Search
None
See application file for complete search history.

(56) References Cited

U.S. PATENT DOCUMENTS

| | | | |
|---|---|---|---|
| 2005/0261981 A1* | 11/2005 | Girdler | G06Q 20/20 705/16 |
| 2011/0181781 A1* | 7/2011 | Oh | G09G 5/12 348/565 |
| 2019/0387645 A1* | 12/2019 | Helberg | G06F 1/1632 |

* cited by examiner

*Primary Examiner* — Sean Shechtman
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for reducing the temperature of a peripheral device to a computing device. A controller can generate a control signal to operate a cooling subsystem to generate an air flow and distribute the air flow over the peripheral device. The controller can receive an indication signal from the peripheral device, generate the control signal based on the received indication signal, and control the cooling subsystem by the control signal to distribute the air flow to a cooling space including the peripheral device and a portion of the computing device including the communication interface. The computing device can further include a sensor configured to sense a temperature within the cooling space, where the controller can be configured to generate the control signal based on the temperature sensed by the sensor.

10 Claims, 6 Drawing Sheets

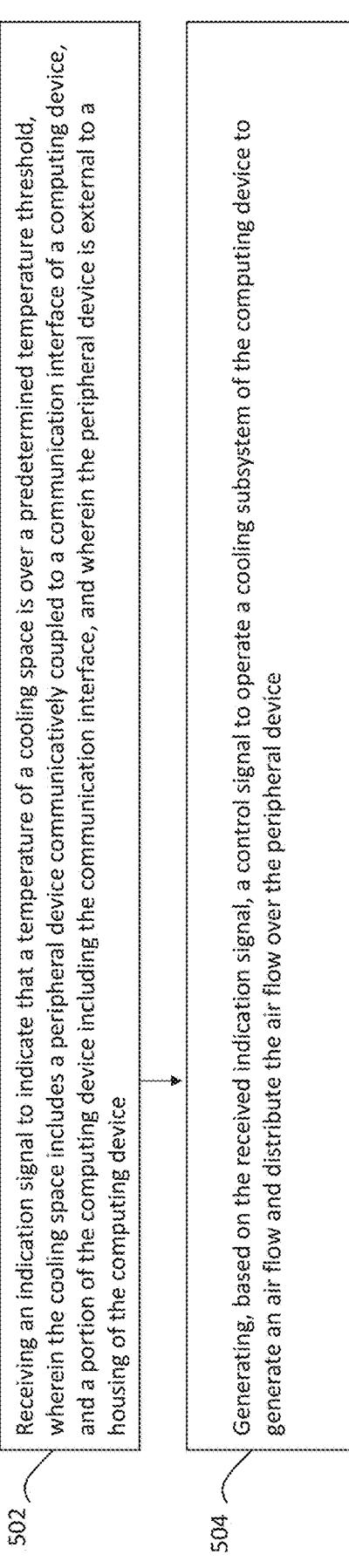

502   Receiving an indication signal to indicate that a temperature of a cooling space is over a predetermined temperature threshold, wherein the cooling space includes a peripheral device communicatively coupled to a communication interface of a computing device, and a portion of the computing device including the communication interface, and wherein the peripheral device is external to a housing of the computing device 504   Generating, based on the received indication signal, a control signal to operate a cooling subsystem of the computing device to generate an air flow and distribute the air flow over the peripheral device

FIG. 5

COOLING SUBSYSTEMS FOR PERIPHERAL DEVICES

BACKGROUND

Field

This disclosure is generally directed to a cooling system of a computing device to cool a peripheral device to the computing device, including a cooling subsystem of the computing device to cool the peripheral device communicatively coupled to the computing device through a communication interface.

Background

A computing device can include various devices such as a computer, a server, a media device, or any other devices that perform computations. A computing device can include various components, such as processors, memory, within the computing device enclosed by a housing. The function of the computing device can also be augmented by peripheral devices coupled to the computing device. A computing device generates waste heat produced by the components such as the graphics board or the processor. A cooling system is required to remove the waste heat produced by the components, to keep components within permissible operating temperature limits.

SUMMARY

Provided herein are system, apparatus, article of manufacture, method and/or computer program product embodiments, and/or combinations and sub-combinations thereof, for controlling a cooling subsystem of a computing device to cool a peripheral device communicatively coupled to the computing device through a communication interface.

An example embodiment of a computing device includes a housing, a display device, a cooling subsystem, a controller located within the housing, and a communication interface configured to be communicatively coupled to a peripheral device external to the housing of the computing device. The peripheral device can provide media content displayed on the display device, or some other functions. In some embodiments, the display device can be placed in a front side of the computing device, and the cooling subsystem includes one or more components may be placed at a back side of the computing device. In some embodiments, the communication interface can be a high-definition multimedia interface (HDMI) interface, and the peripheral device communicates with the controller following a HDMI protocol.

In some embodiments, the controller can be configured to generate a control signal to operate the cooling subsystem to generate an air flow and distribute the air flow over the peripheral device. The controller can be further configured to receive an indication signal from the peripheral device, to generate the control signal based on the received indication signal, and to control the cooling subsystem by the control signal to distribute the air flow to a cooling space including the peripheral device and a portion of the computing device including the communication interface. In some embodiments, the computing device can further include a sensor configured to sense a temperature within the cooling space, where the controller can be configured to generate the control signal based on the temperature sensed by the sensor.

In some embodiments, the cooling subsystem can include a fan configured to generate the air flow, and an air flow distribution device to distribute the air flow towards the cooling space. The fan can be placed within the housing of the computing device, and the air flow distribution device can include a vent placed at an opening of the housing to distribute the air flow through the vent towards the cooling space. In some embodiments, the fan can be placed at least partially external to the housing of the computing device. In some embodiments, the cooling subsystem can include an air inlet external to the housing, and a duct coupled to the inlet and the fan to suck air from outside the housing through the inlet and the duct.

BRIEF DESCRIPTION OF THE FIGURES

The accompanying drawings are incorporated herein and form a part of the specification.

FIG. 5 illustrates an example process performed by a computing device to control a cooling subsystem to cool a peripheral device, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
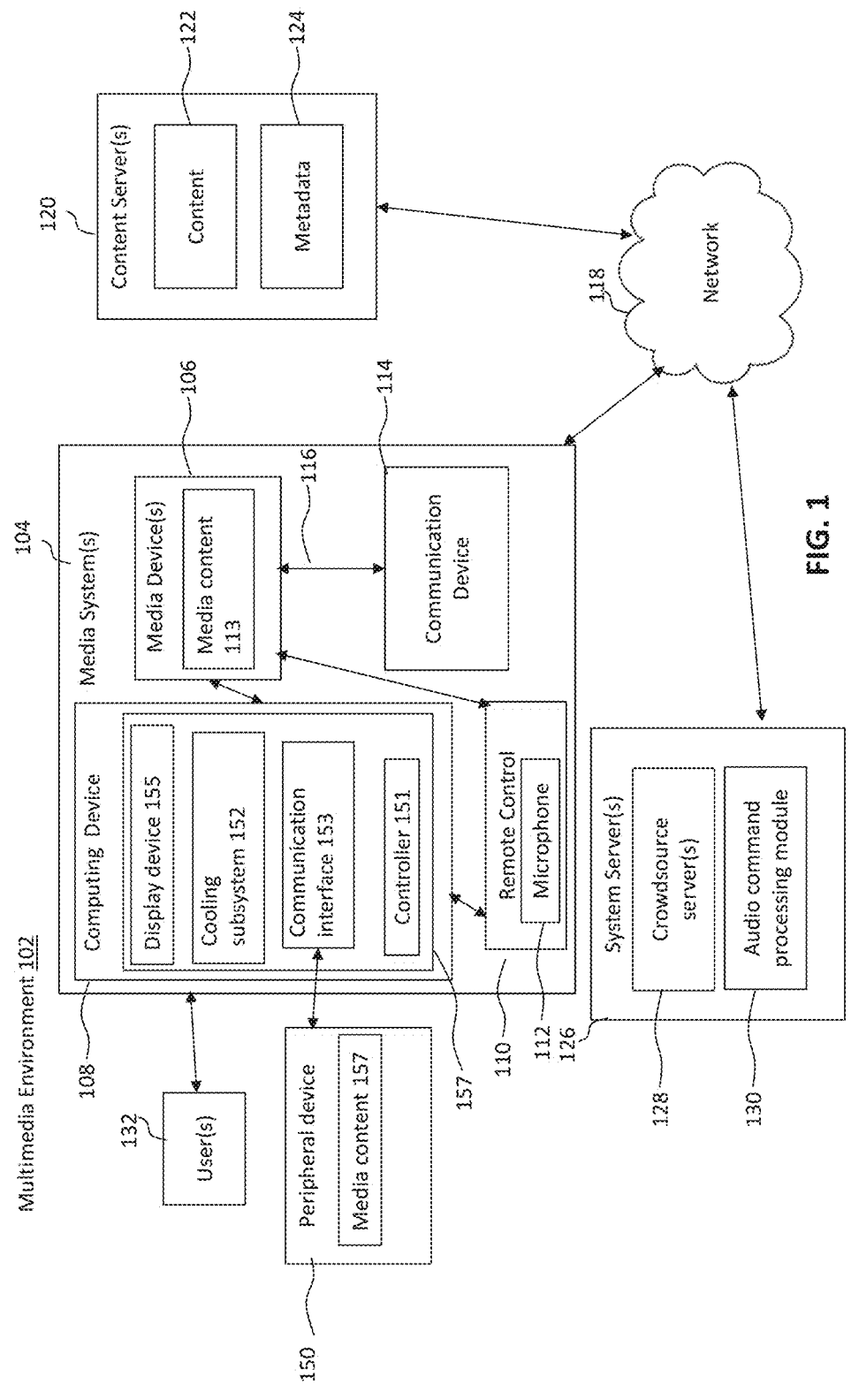
FIG. 1 illustrates a block diagram of a multimedia environment, according to some embodiments.

A computing device can include various components, such as processors, memory, within the computing device enclosed by a housing. A computing device can generate waste heat produced by the components such as the graphics board or the processor within the housing. A cooling system is required to remove the waste heat produced by the components, to keep components within permissible operating temperature limits. A computing device can be further communicatively coupled to peripheral devices, which may be placed at least partially external to the housing of the computing device. However, a typical cooling system of a computing device is designed to remove the waste heat generated by the internal components of the computing device, and normally cannot be used to remove the waste heat generated by peripheral devices, which can be at least partially external to the housing of the computing device.

An example embodiment presents a computing device that can include a cooling subsystem to cool a peripheral device coupled to the computing device through a communication interface. The cooling subsystem may be located within the housing of the computing device, or partially external to the housing of the computing device. The computing device can also include a controller to control the cooling subsystem to cool a peripheral device, where the controller may be located within the housing of the computing device. On the other hand, the peripheral device may be located at least partially external to the housing. For a computing device with the cooling subsystem and the controller, there can be many different kinds of peripheral devices coupled to the computing device through the communication interface located on the computing device. With changing technology, a user can have the flexibility to change the peripheral devices easily as long as the peripheral devices conform to the communication interface. The cooling subsystem and the controller can be used to cool any such peripheral devices coupled to the computing device through the communication interface.

An example embodiment of a multimedia environment includes a computing device having a housing, a display device, a cooling subsystem, a controller located within the housing, and a communication interface configured to be communicatively coupled to a peripheral device external to the housing of the computing device. In some embodiments, the peripheral device can provide media content displayed on the display device, in some other embodiments, the peripheral device can provide other functions to the computing device. The controller can be configured to generate a control signal to operate the cooling subsystem to generate air flow and distribute the air flow to reduce the temperature of the peripheral device. In some embodiments, the cooling subsystem may use other means, such as liquid, or a combination of liquid and air flow, to reduce the temperature of the peripheral device. For example, liquid may be used to circulate within the computing device to reduce the temperature of the air within the computing device to generate cooler air, and a fan or other distribution device can be used to distribute the cooler air to the peripheral device. In addition to cooling the peripheral device, the cooling subsystem may also distribute the air flow to a cooling space including the peripheral device and a portion of the computing device including the communication interface. In some embodiments, the computing device can further include a sensor configured to sense a temperature within the cooling space, where the controller can be configured to generate the control signal based on the temperature sensed by the sensor to operate the cooling subsystem.

In some embodiments, the cooling subsystem can include a fan configured to generate the air flow, and an air flow distribution device to distribute the air flow towards the cooling space and the peripheral device. The fan can be placed within the housing of the computing device, and the air flow distribution device can include a vent placed at an opening of the housing to distribute the air flow through the vent towards the cooling space and the peripheral device in some embodiments, the fan can be placed at least partially external to the housing of the computing device. In some embodiments, the cooling subsystem can include an air inlet external to the housing, and a duct coupled to the inlet and the fan to suck air from outside the housing through the inlet and the duct.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more computing devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, cable box, and/or a digital video recording device, to name just a few examples. Computing device 108 may include a monitor, a television (TV), a computer, a computer monitor, a smart phone, a tablet, a wearable (such as a watch or glasses), an appliance, an interact of things (IoT) device, and/or a projector, to name just a few examples. In some embodiments, media device 106 can be a part of, integrated with, attached to, operatively coupled to, and/or connected to its respective computing device 108. Media device 106 can provide media content 113 to computing device 108.

Computing device 108 may include a housing 157, a display device 155, a cooling subsystem 152, a controller 151, and a communication interface 153 configured to be communicatively coupled to a peripheral device 150 external to housing 157 of computing device 108. In some embodiments, peripheral device 150 can provide media content 157 displayed on display device 155. In some embodiments, display device 155 can be placed in a front side of computing device 108, and cooling subsystem 152 includes one or more components placed at a back side of computing device 108. In some embodiments, communication interface 153 can be a high-definition multimedia interface (HDMI) interface, and peripheral device 150 may communicate with controller 51 following a HDMI protocol.

Media devices 106 can provide media content 113 to computing device 108. In addition, peripheral device 150 can provide media content 157 to computing device 108. In some embodiments, media device 106 may not exist, and media content is only provided by peripheral device 150. Peripheral device 150 can improve the functions of computing device 108, in addition to the content provided by media devices 106. In some embodiments, media devices 106 can be the same device as peripheral device 150.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, computing device 108, such as a remote control, a tablet, laptop computer, smartphone, wearable, on-screen controls, integrated control buttons, audio controls, or any combination thereof to name just a few examples. In an embodiment, remote control 110 wirelessly communicates with media device 106, or computing device 108 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies. TV programs, multimedia, images, still pictures, text, graphics, gaming applications, advertisements, programming content, public service content, government content, local community content, software, and/or any other content or data objects in electronic form. Content 122 may be the source for media content 113 displayed on computing device 108.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems

104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as computing device 108). In some embodiments, media device 106 may be audio responsive, and the audio data may represent verbal commands from user 132 to control media device 106 as well as other components in media system 104, such as computing device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
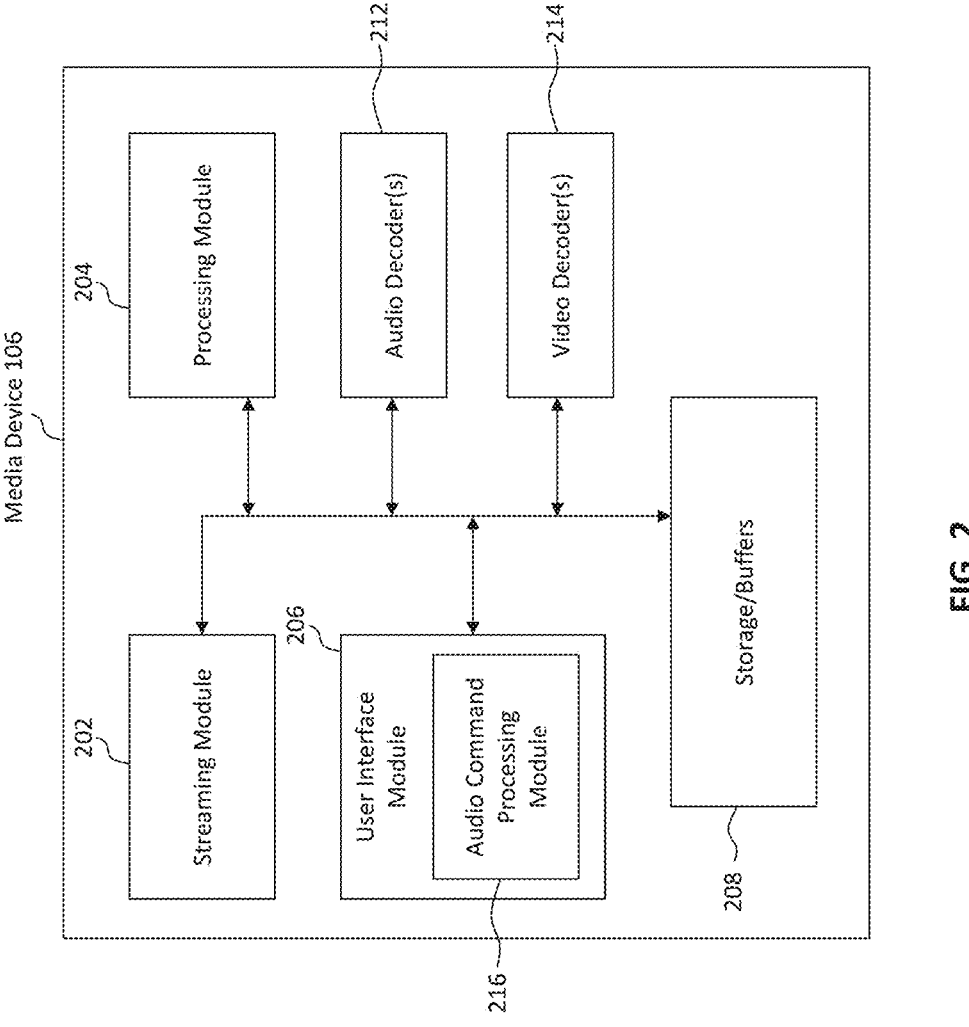
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216. In some embodiments, media devices 106 can be an example of peripheral device 150.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-IS, MPEG-2 PS, MPEG-2 TS, WAV. Broadcast WAV, LXF, GXF, and/or VOB, to name just some examples. Each video decoder 214 may include one or more video codecs, such as but not limited to H.263, H264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 or computing device 108, via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to computing device 108 for playback to user 132. Media content can also be provided by peripheral device 150 external to housing 157 of computing device 108.

In streaming embodiments, streaming module 202 may transmit the content to computing device 108 in real time or near real time as it receives such content from content server(s) 120, In non-streaming embodiments, media device 106 may store the content received from content server(s) 120 in storage/buffers 208 for later playback on computing device 108.

Coordination Between a Source Media Device, a Host Device, and a Speaker Device.

Figure 3:
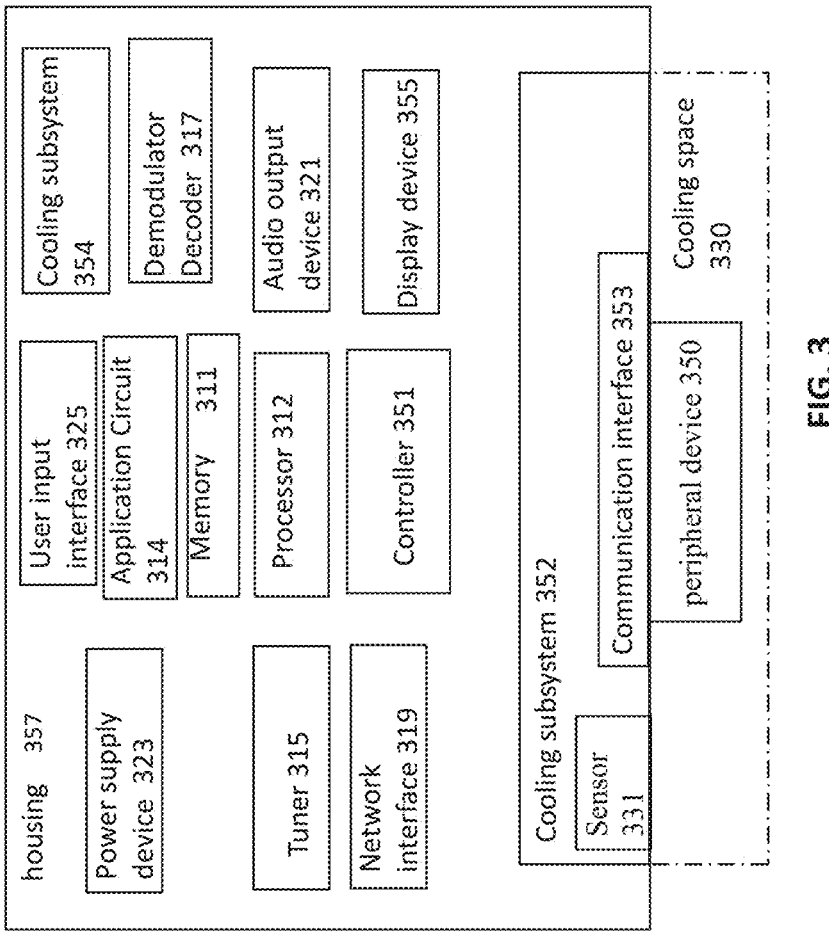
FIG. 3 illustrates an example computing device including a cooling subsystem to cool a peripheral device, according to some embodiments.

FIG. 3 illustrates computing device 308 including cooling subsystem 352 to cool peripheral device 350, where computing device 308 can be similar to computing device 108, which is a part of multimedia environment 102 as described in FIG. 1. In some embodiments, computing device 308 may include housing 357, display device 355, cooling subsystem 352, controller 351, and communication interface 353 configured to be communicatively coupled to peripheral device 350 external to housing 357 of computing device 308. Housing 357, display device 355, cooling subsystem 352, controller 351, and communication interface 353 may be examples of housing 157, display device 155, cooling subsystem 152, controller 151, and communication interface 153, respectively.

In some embodiments, computing device 308 may have housing 357 that encloses various components. Computing device 308 may be a device that can receive video or audio input from various sources, such as through a tuner 315, a network interface 319, or communication interface 353. After receiving the video or audio input, a demodulator or decoder 317 may perform various signal processing operations on the video or audio input to produce video or audio output. The audio output may be audibly output played through an audio output device 321. Similarly, the video output may be displayed on display device 355.

In some embodiments, computing device 308 may include various computing components, such as application circuit 314, memory 311, processor 312, controller 351, or a user interface 325. The user input interface 325 may transmit a signal input by the user to processor 312, and send a signal from processor 312 to the user. In addition, a power supply device 323 may supply power to the various components such as display device 355, audio output device 321, demodulator or decoder 317, and any other components.

In some embodiments, computing device 308 may include cooling subsystem 352 and cooling subsystem 354. Cooling subsystem 352 can be used to cool peripheral device 350, while cooling subsystem 354 can be used to cool internal components of computing device 308, such as application circuit 314, memory 311, processor 312, controller 351, or any other component. In some embodiments, cooling subsystem 352 and cooling subsystem 354 may be integrated to form a larger cooling system. In some other embodiments, cooling subsystem 352 and cooling subsystem 354 may be separated subsystems within computing device 308.

Components shown in FIG. 3 are for example only, and may not be included in some of the example embodiments.

In some embodiments, tuner 315 may select a radio frequency (RF) broadcast signal received through an antenna, and convert the RF broadcast signal to an intermediate frequency (IF) signal or a baseband video or audio signal. The RF broadcast signal can be a digital, or an analog broadcast signal. The RF broadcast signal may be received from a single carrier based on an advanced television system committee (ATSC) mode, or received from multiple carriers based on a digital video broadcasting mode (DVB). The RE broadcast signal can be converted to a digital IF signal (DIF) or an analog baseband video or audio signal depending on whether the RF broadcast signal is a digital or analog broadcast signal.

In some embodiments, demodulator or decoder 317 can receive the DIF signal converted by tuner 315 and demodulate the INF signal. Demodulator or decoder 317 may convert encoded video and audio signals into a format suitable for output to a display device or an audio output device. For instance, demodulator or decoder 317 may receive MPEG video and audio signals to be output to a television. Demodulator or decoder 317 may output a stream signal after performing demodulation and channel decoding. The stream signal may be a multiplexed signal including a video signal, an audio signal and a data signal. For example, the stream signal may be MPEG-2 transport stream where a video signal of an MPEG-2 specification and an audio signal of Dolby AC-3 specification are multiplexed. The stream signal output from demodulator or decoder 317 may be processed by processor 312, and supplied to display device 355 or audio output device 321 such as a speaker.

In some embodiments, network interface 319 may be an interface for connecting computing device 308 to a wired/wireless network including an Internet network. Network interface 319 may include an Ethernet terminal for a wired network connection, an interface for wireless LAN (WLAN) (Wi-Fi), wireless broadband, microwave access (Wimax), or any other network technology. In some embodiments, network interface 319 may be an interface for short-distance wireless communication with other electronic devices, such as Bluetooth, Radio Frequency Identification (RFID), infrared Data Association (IrDA), Ultra Wideband (UWB), ZigBee, or other wireless communication interface. Network interface 319 may receive content such as movies, advertisements, games, or broadcast signals and information associated with the content provided by the Internet or content provider over a network. Network interface 319 may transmit data to the Internet or content provider.

In some embodiments, memory 311 may store a program for performing signal processing and control by processor 312, and may store a processed video, audio or data signal. Memory 311 may perform a function to temporarily store a video, audio, or data through communication interface 353 and peripheral device 350.

In some embodiments, display device 355 may display an image, a video, or data processed or generated by processor 312. Display device 355 may be flat or curved. Display device 355 may be a cathode ray tube display, or a flat panel display having lower weight and volume than the cathode ray tube display. Display panels for the flat panel display may include a liquid crystal display panel (LCD), a field emission display panel (FED), a plasma display panel (PDP), an electro-luminescence (EL) display panel, or any other display panel.

In some embodiments, communication interface 353 may connect peripheral device 350 to computing device 308. Peripheral device 350 may be external to housing 357 of computing device 308. Peripheral device 350 may include an audio/video input/output device, such as a. Universal Serial Bus (USB) device, a composites video banking sync (CVBS) device, an s-video terminal (analog) device, a digital visual interface (DVI) device, a HDMI device, or any other peripheral device defined by various industry standards. For example, peripheral device 350 can be a digital versatile disks (DVD) device, a Blu-rays device, a game device, a camera, a camcorder, a computer (e.g., laptops), a streaming media device, through wire/wireless cables. Communication interface 353 may transmit a video, audio, or data signal externally input through peripheral device 350. Also, communication interface 353 may transmit video, audio or data signal output to peripheral device 350. Peripheral device 350 can improve the functions of computing device 308. In some embodiments, communication interface 353 can be a interface, and peripheral device 350 may communicate with controller 351 following a HDMI protocol.

In some embodiments, cooling subsystem 352 and controller 351 may be located within housing 357. Controller 351 may be a separated processor from processor 312, where processor 312 may perform operations related to the designed function of computing device 308, while controller 351 may manage the cooling function of cooling subsystem 352. In some other embodiments, controller 351 and processor 312 may be the same processor.

In some embodiments, controller 351 can be configured to generate a control signal to operate cooling subsystem 352 to generate an air flow and distribute the air flow over peripheral device 350. Controller 351 can be further configured to receive an indication signal from peripheral device 350, to generate the control signal based on the received indication signal, and to control cooling subsystem 352 by the control signal to distribute the air flow to a cooling space 330 including peripheral device 350 and a portion of computing device 308 including communication interface 353. Accordingly, peripheral device 350 may be able to control when and how cooling subsystem 352 is used to reduce the temperature of peripheral device 350. For example, the content stored in peripheral device 350 can provide different meta data or record to indicate that some video intensive scenes may be played in the next few time instances, e.g., in the next 2 minutes, and such video intensive scenes may produce higher heat. Additionally and alternatively, peripheral device 350 may include a processor that can communicate instructions to controller 351 to control when and how cooling subsystem 352 is used to reduce the temperature of peripheral device 350, Hence, a control signal may be generated by peripheral device 350 to activate cooling subsystem 352 or increase the speed of cooling subsystem 352 so that additional cooling power can be generated to reduce the temperature of peripheral device 350.

In some embodiments, computing device 308 can further include a sensor 331 configured to sense a temperature within cooling space 330, where controller 351 can be configured to generate the control signal based on the temperature sensed by sensor 331. Accordingly, controller 351 can control the operation of cooling subsystem 352 based on the sensed temperature of cooling space 330. In some embodiments, there may be multiple sensors located in various locations within cooling space 330.

Figure 4:
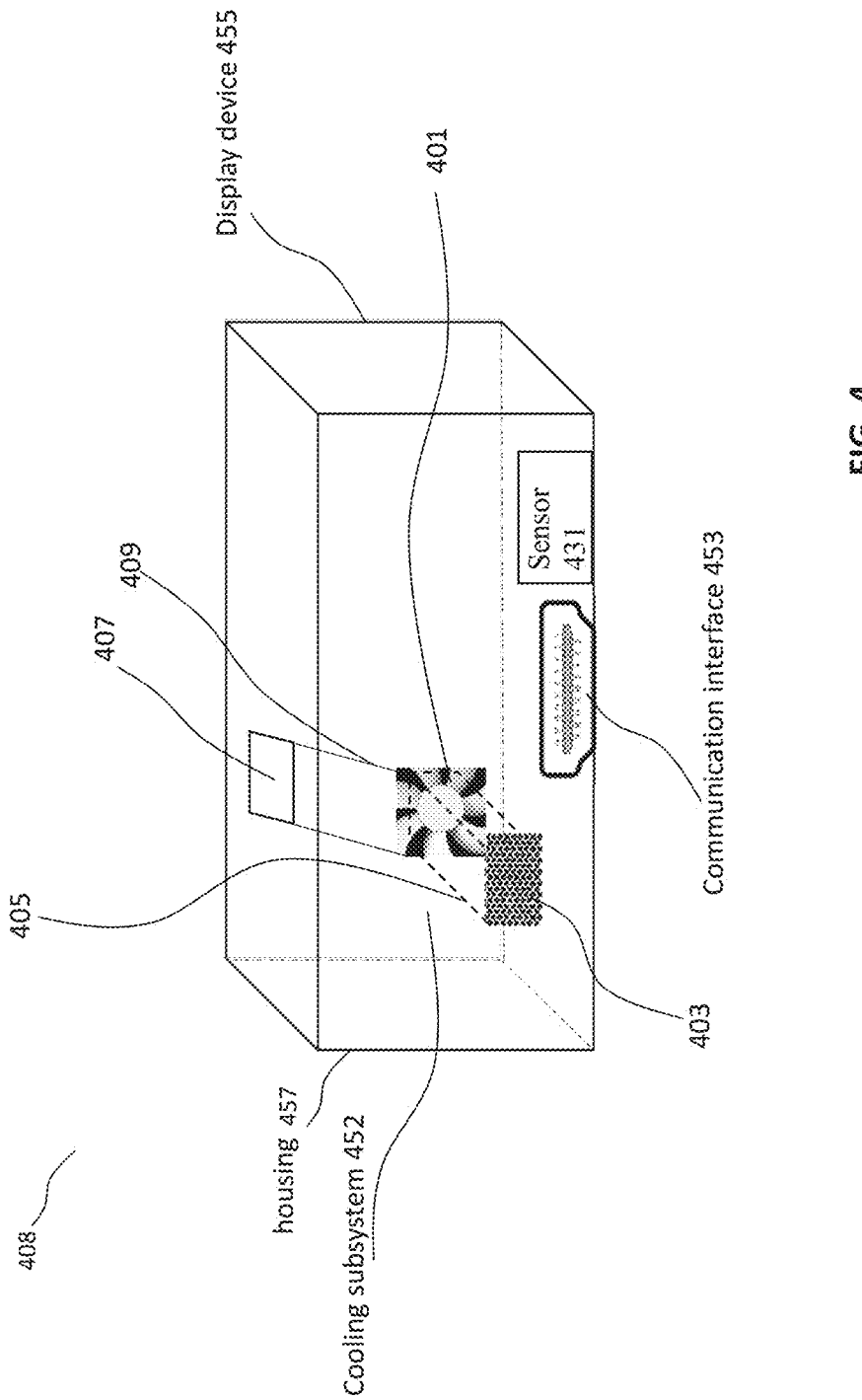
FIG. 4 illustrates another example computing device including a cooling subsystem to cool a peripheral device, according to some embodiments.

FIG. 4 illustrates more details of cooling subsystem 452, which can be similar to cooling subsystem 152. In some embodiments, display device 455 can be placed in a front side of computing device 408, and cooling subsystem 452 may include one or more components placed at a back side of computing device 408, where the front side is in an opposite direction of the back side of computing device 408. Computing device 408 and display device 455 may be examples of computing device 108 and display device 155.

In some embodiments, cooling subsystem 452 can include a fan 401 configured to generate the air flow, and an air flow distribution device 405 to distribute the air flow towards the cooling space. Fan 401 can be placed within housing 457 of computing device 408. Fan 401 may include fan motors (not shown) to rotate the axial flow fans. Air flow distribution device 405 can include a vent 403 placed at an opening of housing 457 to distribute the air flow through vent 403 towards cooling space. In some embodiments, fan 401 can be placed at least partially external to housing 457 of computing device 408. In some embodiments, cooling subsystem 452 can include an air inlet 407 external to housing 457, and a duct 409 coupled to inlet 407 and fan 401 to suck air from outside housing 457 through inlet 407 and duct 409.

In some embodiments, there may not be inlet 407, and duct 409. Instead, fan 401 simply circulates air inside computing device 408. In some other embodiments, fan 401, inlet 407, and duct 409 may form an air intake system that draws in air from outside computing device 408, supplies air from outside to inside computing device 408. When air is drawn in from outside computing device 408, and fan 401 continuously rotates, the airflow generated by fan 401 moves from one side of computing device 408 to the other side of computing device 408, which may improve heat dissipation of peripheral device.

In some embodiments, internal air is discharged to the outside vent 403 and air flow distribution device 405, and distribute the air flow towards the cooling space. Vent 403 may be formed close or around peripheral device, such as peripheral device 150, so as to pass the air over, through, or in contact with peripheral device or within the cooling space. There may be a variety of structures for air flow distribution device 405 to distribute the airflow generated by the fan 401, such as additional fans, directional device, and other devices. In some embodiments, there can be cooling metal in contacts with peripheral device, where the temperature of the cooling metal can be controlled by the air through the air flow distribution device 405, and the cool metal can reduce the temperature of peripheral device.

FIG. 5 illustrates an example process 500 performed by a computing device to control a cooling subsystem to cool a peripheral device, according to some embodiments. FIG. 5 illustrates an example process 500 performed by computing device 108 to cool peripheral device 150. Processes 500 can be performed by processing logic that can comprise hardware (e.g., circuitry, dedicated logic, programmable logic, microcode, etc.), software (e.g., instructions executing on a processing device, such as by controller 151), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 502, controller 151 can receive an indication signal to indicate that a temperature of a cooling space is over a predetermined temperature threshold. The cooling space may include a peripheral device communicatively coupled to a communication interface of the computing device, and a portion of the computing device including the communication interface, and the peripheral device is external to a housing of the computing device. For example, as described for FIGS. 3-4, controller 151 can receive an indication signal to indicate that a temperature of cooling space 330 is over a predetermined temperature threshold. The cooling space 330 includes peripheral device 150 communicatively coupled to communication interface 153. Cooling space 330 also includes a portion of computing device 108 including communication interface 153.

At 504, controller 151 can generate, based on the received indication signal, a control signal to operate a cooling subsystem of the computing device to generate an air flow and distribute the air flow over the peripheral device. For example, as described for FIGS. 3-4, controller 151 can generate, based on the received indication signal, a control signal to operate cooling subsystem 152, e.g., fan 401, to generate an air flow and distribute the air flow over peripheral device 150, where the air flow can be distributed through air flow distribution device 405 to distribute the air flow towards cooling space 330.

Example Computer System

Figure 6:
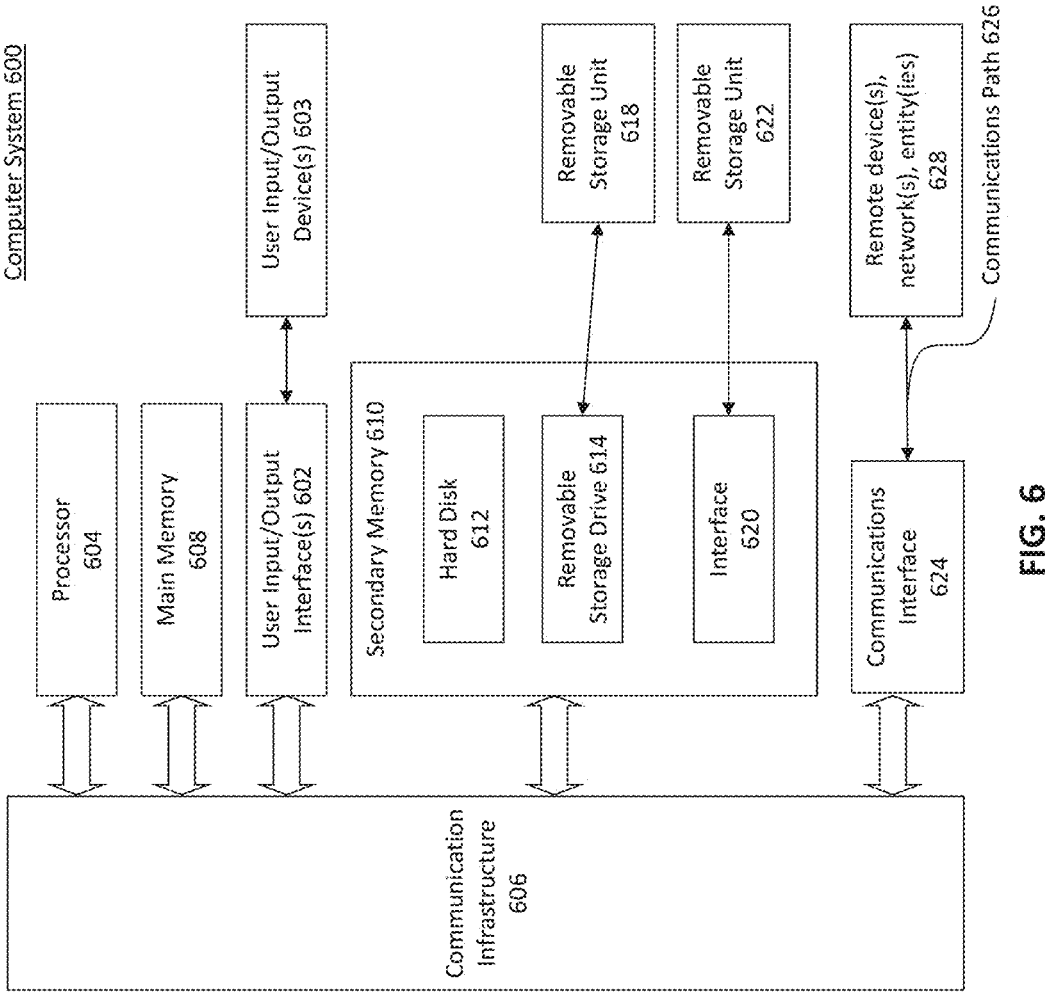
FIG. 6 illustrates an example computer system useful for implementing various embodiments.

Various embodiments may be implemented, for example, using one or more well-known computer systems, such as computer system 600 shown in FIG. 6. For example, media device 106, or computing device 108 may be implemented using combinations or sub-combinations of computer system 600 to perform various functions described herein, e.g., by process 500. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (Paas), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML Extensible Hypertext Markup Language (XHTML), Wireless Markup Language (WML), MessagePack, XML User Interface Language (XIII), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, nota-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring; to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computing device, comprising:
   a display device to display media content;
   a cooling subsystem configured to cool a peripheral device, wherein the peripheral device is external to a housing of the computing device and the cooling subsystem is internal to the housing of the computing device;
   a communication interface configured to be communicatively coupled to the peripheral device external to the housing of the computing device, wherein the peripheral device provides the media content displayed on the display device;
   a sensor, internal to the housing of the computing device, configured to sense a temperature within a cooling space including the peripheral device; and
   a controller located within the housing of the computing device and communicatively coupled to the cooling subsystem and the communication interface,
   wherein the controller is configured to generate a control signal to operate the cooling subsystem based on the temperature sensed by the sensor to generate an air flow and distribute the air flow over the peripheral device communicatively coupled to the communication interface,
   wherein the cooling subsystem comprises a fan to direct the air flow through a vent placed at an opening at a back side of the housing of the computing device and towards the peripheral device,
   wherein the fan is placed within the housing of the computing device,
   wherein a direction of the air flow is from the fan to the vent to the peripheral device, and
   wherein the control signal operates the fan to generate the air flow through the vent and towards the peripheral device.

2. The computing device of claim 1, wherein the communication interface is a high-definition multimedia interface (HDMI) interface, and the peripheral device communicates with the controller following an HDMI protocol.

3. The computing device of claim 1, wherein the controller is further configured to receive an indication signal from the peripheral device and to generate the control signal based on the received indication signal.

4. The computing device of claim 1, wherein the controller is configured to control the cooling subsystem by the control signal to distribute the air flow to the cooling space including the peripheral device and a portion of the computing device including the communication interface.

5. The computing device of claim 1, wherein the cooling subsystem includes an air inlet external to the housing of the computing device, and a duct coupled to the air inlet and the fan to suck air from outside the housing of the computing device through the air inlet and the duct.

6. The computing device of claim 1, wherein the display device is placed in a front side of the computing device, and the cooling subsystem includes one or more components placed at the back side of the computing device, and wherein the front side is in an opposite direction of the back side of the computing device.

7. The computing device of claim 1, wherein the cooling subsystem further comprises an air flow distribution device positioned between the fan and the vent.

8. The computing device of claim 7, wherein the air flow distribution device comprises a directional device.

9. The computing device of claim 7, wherein the air flow distribution device comprises an additional fan.

10. The computing device of claim 1, wherein the cooling subsystem further comprises a cooling metal in contact with the peripheral device.

\* \* \* \* \*